US011046147B2

(12) United States Patent
Takeichi

(10) Patent No.: US 11,046,147 B2
(45) Date of Patent: Jun. 29, 2021

(54) CABIN CONDENSER INTEGRATED TEMPERATURE CONTROL SYSTEM

(71) Applicant: DENSO International America, Inc., Southfield, MI (US)

(72) Inventor: Kota Takeichi, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 176 days.

(21) Appl. No.: 16/257,946

(22) Filed: Jan. 25, 2019

(65) Prior Publication Data

US 2020/0238792 A1 Jul. 30, 2020

(51) Int. Cl.

*B60H 1/00* (2006.01)
*B60H 1/32* (2006.01)
*F28F 9/26* (2006.01)
*F28D 21/00* (2006.01)
*F28F 9/02* (2006.01)

(52) U.S. Cl.

CPC ..... *B60H 1/00899* (2013.01); *B60H 1/00278* (2013.01); *B60H 1/3227* (2013.01); *F28D 2021/0084* (2013.01); *F28F 9/0231* (2013.01); *F28F 9/0246* (2013.01); *F28F 9/26* (2013.01)

(58) Field of Classification Search

CPC ............ B60H 1/00899; B60H 1/00921; B60H 1/143; B60H 1/3204; B60H 1/3228; B60H 1/32281; B60H 1/32284; B60H 1/00278; B60H 1/3227; B60H 2001/00307; F28F 9/0231; F28F 9/0246; F28F 9/26; F28D 2021/0084; F28D 1/0417; F28D 1/0452; F25B 2339/0445; F25B 2600/2503; F25B 40/02; F25B 39/04

See application file for complete search history.

(56) References Cited

U.S. PATENT DOCUMENTS

| | | | | |
|---|---|---|---|---|
| 6,125,643 | A * | 10/2000 | Noda | F25B 6/00 62/196.4 |
| 6,308,770 | B1 * | 10/2001 | Shikata | B60H 1/00064 165/126 |
| 7,490,662 | B2 * | 2/2009 | Eliades | F28F 27/02 165/297 |
| 9,499,026 | B2 * | 11/2016 | Brodie | F25B 41/003 |
| 9,803,896 | B2 | 10/2017 | Benouali et al. | |
| 10,744,854 | B2 * | 8/2020 | Kim | B60H 1/00057 |
| 2014/0075974 | A1 * | 3/2014 | Klein | B60H 1/00057 62/119 |
| 2014/0374060 | A1 | 12/2014 | Labaste Mauhe et al. | |

FOREIGN PATENT DOCUMENTS

| | | |
|---|---|---|
| CN | 107512150 A | 12/2017 |
| EP | 2263894 B1 | 10/2013 |

OTHER PUBLICATIONS

How Car Cooling Systems Work—NICE (Jun. 2003) (Year: 2003).*

* cited by examiner

*Primary Examiner* — Len Tran
*Assistant Examiner* — Jenna M Hopkins
(74) *Attorney, Agent, or Firm* — Harness, Dickey & Pierce, P.L.C.

(57) ABSTRACT

A cabin condenser for a heating, ventilation, and air conditioning (HVAC) system for a battery electric vehicle (BEV). The cabin condenser includes a first cabin condenser portion and a second cabin condenser portion. A regulator is configured to control flow of refrigerant from the first cabin condenser portion to the second cabin condenser portion.

18 Claims, 4 Drawing Sheets

60
50
110
Cabin Condenser
Evap.
70B
70A
TXV
54
52
20
Battery INV/MG
36
S/V
Compressor
22
26
28
24
Chiller
TXV
34
S/V
32
30
Condenser
10

110
112
118
116
114

136
216
240
130
132
212
70A
230
232
210
214
234
134
218
70B

CABIN CONDENSER INTEGRATED TEMPERATURE CONTROL SYSTEM

FIELD

The present disclosure relates to a cabin condenser integrated temperature control system for a heating, ventilation, and air conditioning system.

BACKGROUND

This section provides background information related to the present disclosure, which is not necessarily prior art.

Battery electric vehicles (BEV) are becoming more and more popular. BEVs do not have an internal combustion engine (ICE), which has traditionally been a source of heat for heating the passenger cabin. To heat the passenger cabin, BEVs often rely on a heat pump, which includes a cabin condenser that generates warm air flow from waste heat of a chiller. While such heat pump systems are suitable for their intended use, they are subject to improvement. For example, the temperature of airflow warmed by the cabin condenser depends on the chiller waste heat capacity. Thus, when the chiller waste heat capacity is relatively high, the temperature of the airflow is also relatively high, which may make occupants of the passenger cabin uncomfortable. The present disclosure advantageously provides for an improved cabin condenser with temperature control. In addition to the advantages set forth herein, one skilled in the art will appreciate that the present disclosure provides numerous additional advantages and unexpected results.

SUMMARY

This section provides a general summary of the disclosure, and is not a comprehensive disclosure of its full scope or all of its features.

The present disclosure includes a cabin condenser for a heating, ventilation, and air conditioning (HVAC) system for a battery electric vehicle (BEV). The cabin condenser includes a first cabin condenser portion and a second cabin condenser portion. A regulator is configured to control flow of refrigerant from the first cabin condenser portion to the second cabin condenser portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
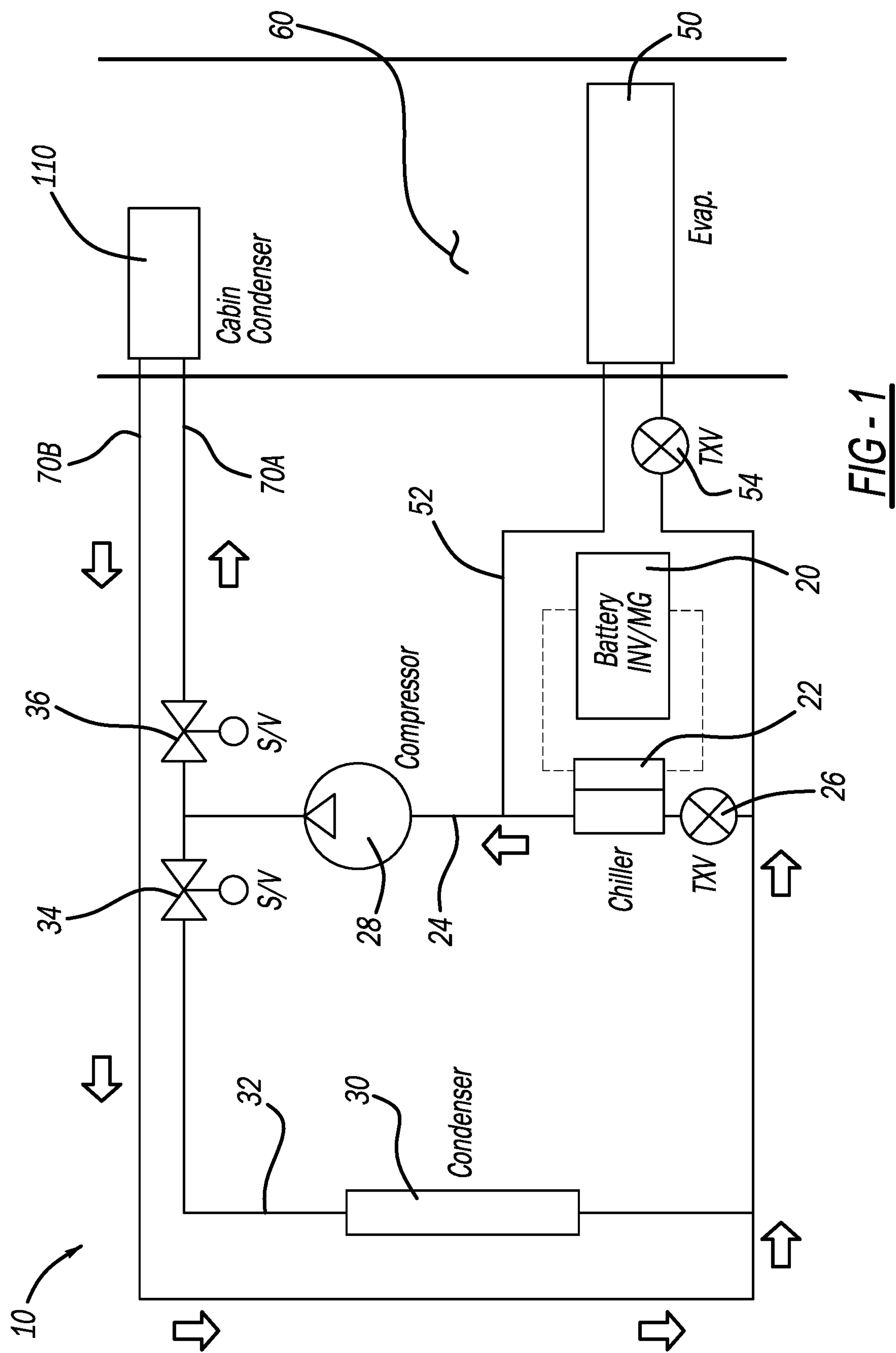
FIG. 1 illustrates a heating, ventilation, and air conditioning (HVAC) system in accordance with the present disclosure.

FIG. 1 illustrates an exemplary heating, ventilation, and air conditioning system 10 in accordance with the present disclosure. The HVAC system 10 is configured for use with any suitable battery electric vehicle (BEV). The BEV may be, for example, a passenger vehicle, mass transit vehicle, recreational vehicle, utility vehicle, military vehicle/equipment, construction vehicle/equipment, commercial vehicle, etc.

The HVAC system 10 includes a battery 20 for partially or fully propelling the vehicle. The battery 20 is cooled by a chiller 22. The chiller 22 is a heat exchanger, which transfers thermal energy from a battery coolant loop to a refrigerant loop to maintain the battery 20 at an optimal operating temperature. The chiller 22 is arranged along a refrigerant line 24 of the refrigerant loop between a thermal expansion valve (TXV) 26 and a compressor 28.

Refrigerant compressed by the compressor 28 may be directed to an external condenser 30 arranged along an external condenser refrigerant loop 32. Flow of refrigerant to the external condenser 30 is controlled by any suitable valve 34. From the condenser 30, the refrigerant returns to the chiller 22. Flow of the refrigerant back to the chiller 22 is controlled by the TXV 26.

Some of the refrigerant may also be directed to an evaporator 50, which is arranged along an evaporator loop 52. Flow of the refrigerant to the evaporator 50 is controlled by TXV 54. At the evaporator 50, the refrigerant is a cold vapor at low pressure. The evaporator 50 is arranged to cool airflow of a passenger cabin of the vehicle. In the example of FIG. 1, the evaporator 50 is arranged with an airflow duct 60, which leads to the passenger cabin, as explained further herein.

A portion of the refrigerant compressed by the compressor 28 may be directed to a cabin condenser 110. Specifically, refrigerant compressed by the compressor 28 flows through refrigerant line 70A to the cabin condenser 110, and flows from the cabin condenser 110 through refrigerant line 70B back to the TXV 26 and the TXV 54 of the evaporator loop 52. Flow of refrigerant from the compressor 28 to the cabin condenser 110 is controlled by valve 36.

Figure 2:
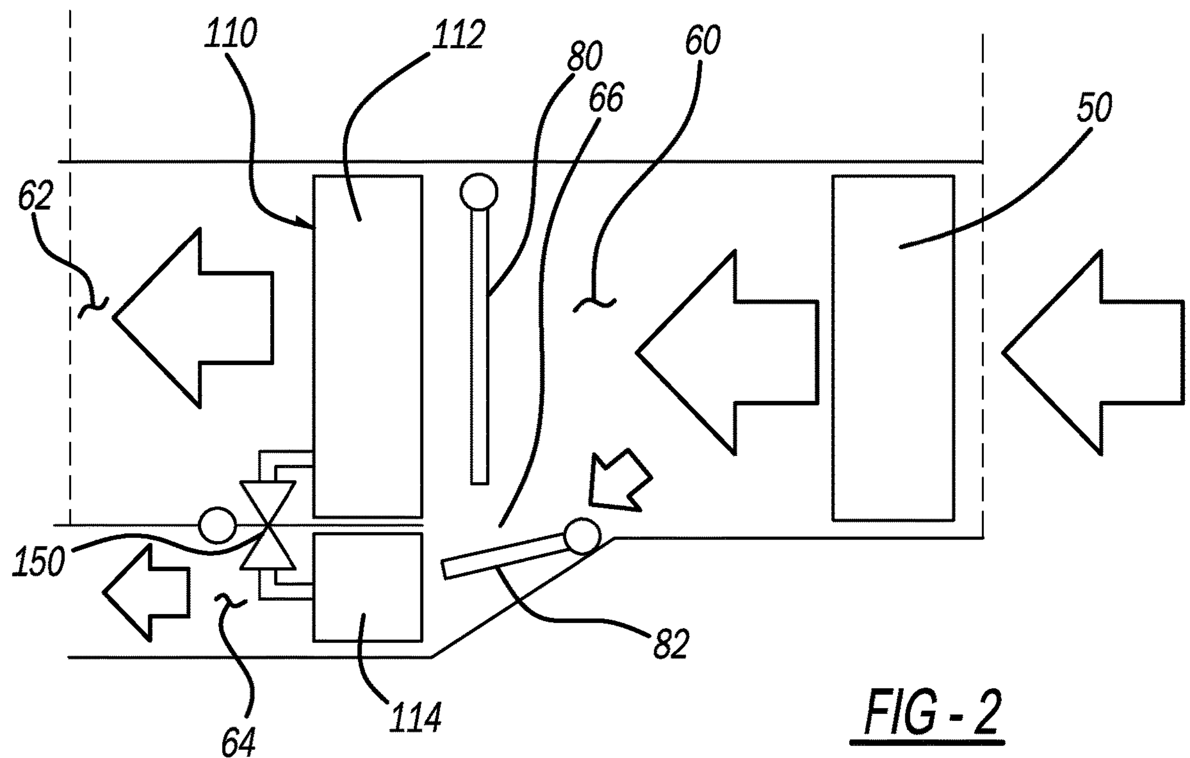
FIG. 2 is a close-up side view of a cabin condenser assembly and an evaporator of the HVAC system of FIG. 1.

With additional reference to FIG. 2, the cabin condenser 110 is arranged within the airflow duct 60 downstream of the evaporator 50. The cabin condenser 110 includes a first cabin condenser portion 112 and a second cabin condenser portion 114. In the example illustrated, the first cabin condenser portion 112 is arranged within a first airflow duct portion 62, which leads to a passenger cabin of the vehicle. The second cabin condenser portion 114 is arranged within a second airflow duct portion 64, which leads to an exterior of the vehicle. The duct 60 defines an opening or aperture 66, which leads to the second airflow duct portion 64.

Figure 3:
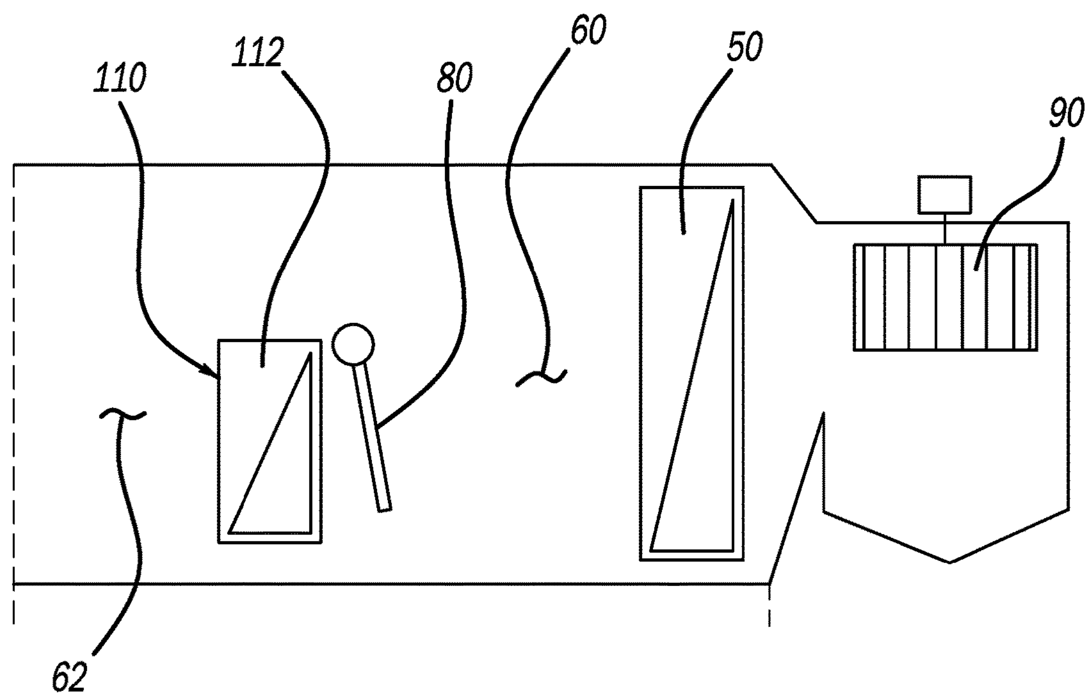
FIG. 3 is a close-up top view of the cabin condenser assembly and the evaporator of FIG. 2.

With continued reference to FIGS. 1 and 2, and additional reference to FIG. 3, airflow through the first cabin condenser portion 112 is controlled by any suitable airflow control device, such as air-mix door 80. Airflow to the second airflow duct portion 64 is controlled by any suitable airflow control device, such as airflow control door 82 arranged at the opening 66. With particular reference to FIG. 3, a blower

90 is arranged in the airflow duct 60 to generate airflow through the evaporator 50 and the cabin condenser 110. In the example of FIG. 3, the evaporator 50 is arranged between the blower 90 and the cabin condenser 110. With additional reference to FIGS. 4A and 4B, the first and second cabin condenser portions 112 and 114 may have a separator 116 therebetween, and arranged within a common housing 118. Alternatively, the first and second cabin condenser portions 112 and 114 may be arranged in independent housings.

The first cabin condenser portion 112 includes a first condenser inlet 130, which is connected to refrigerant line 70A. Refrigerant compressed by the compressor 28 flows through refrigerant line 70A and enters the first cabin condenser portion 112 through the first condenser inlet 130. The refrigerant flows through tubes of the first cabin condenser portion 112, and exits the first cabin condenser portion 112 through a first condenser outlet 132. From the first condenser outlet 132, the refrigerant flows into a regulator 210.

The regulator 210 includes a first regulator inlet 212 through which the refrigerant enters the regulator 210. The regulator 210 further includes a first regulator outlet 214, which is connected to a second condenser inlet 134 of the second cabin condenser portion 114. Refrigerant from the regulator 210 enters the second cabin condenser portion 114 through the second condenser inlet 134, flows through the tubes of the second cabin condenser portion 114, and exits the second cabin condenser portion 114 through a second condenser outlet 136. The second condenser outlet 136 is connected to a second regulator inlet 216 of the regulator 210. Thus refrigerant reenters the regulator 210 through the second regulator inlet 216, flows through a passageway 240 of the regulator 210, and exits the regulator 210 through a second regulator outlet 218. From the second regulator outlet 218 refrigerant flows into refrigerant line 70B, and back to the TXV 26 and the TXV 54.

Figure 4A:
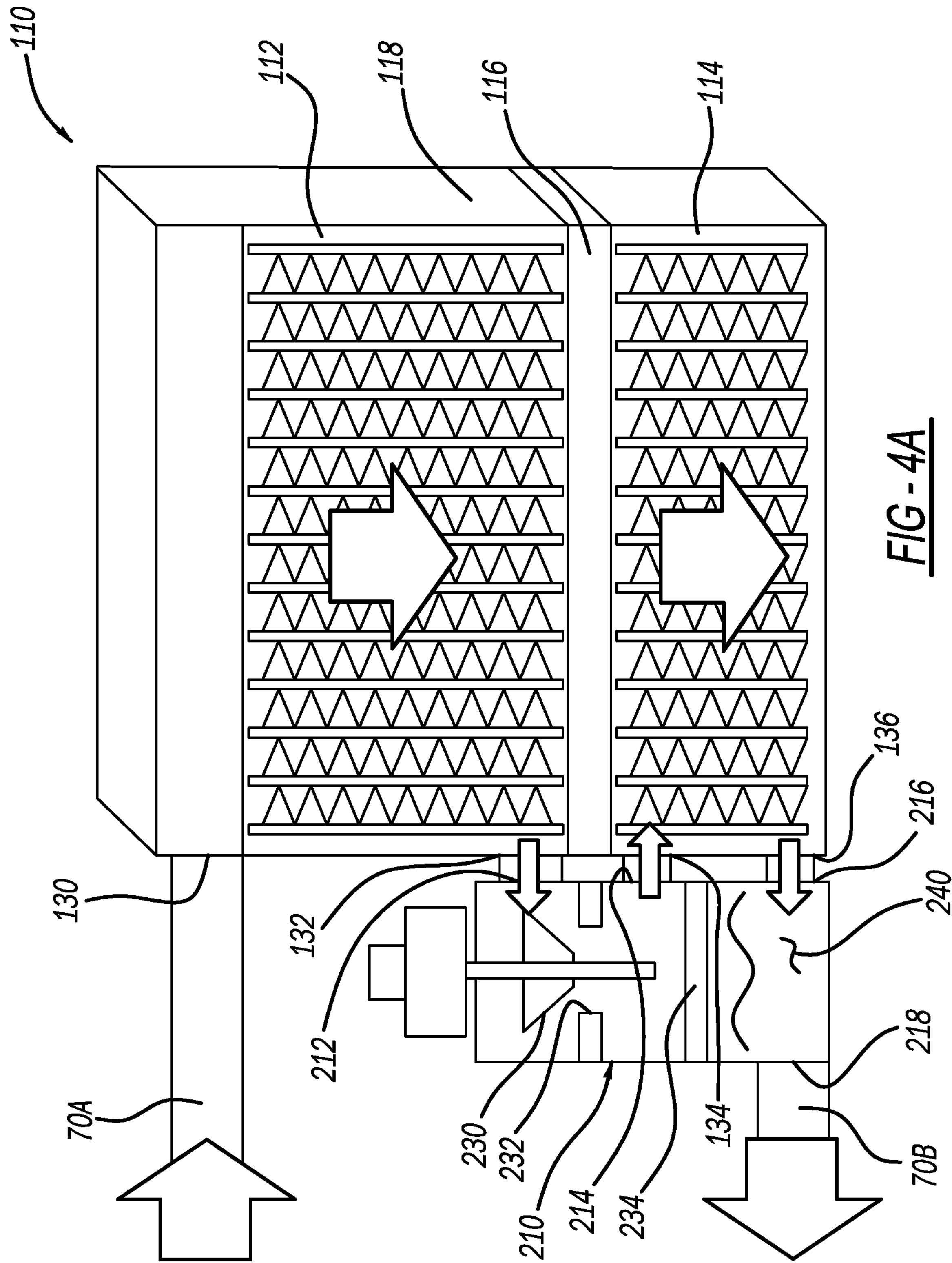
FIG. 4A illustrates the cabin condenser assembly and a regulator thereof, the regulator in a partially open position.
Figure 4B:
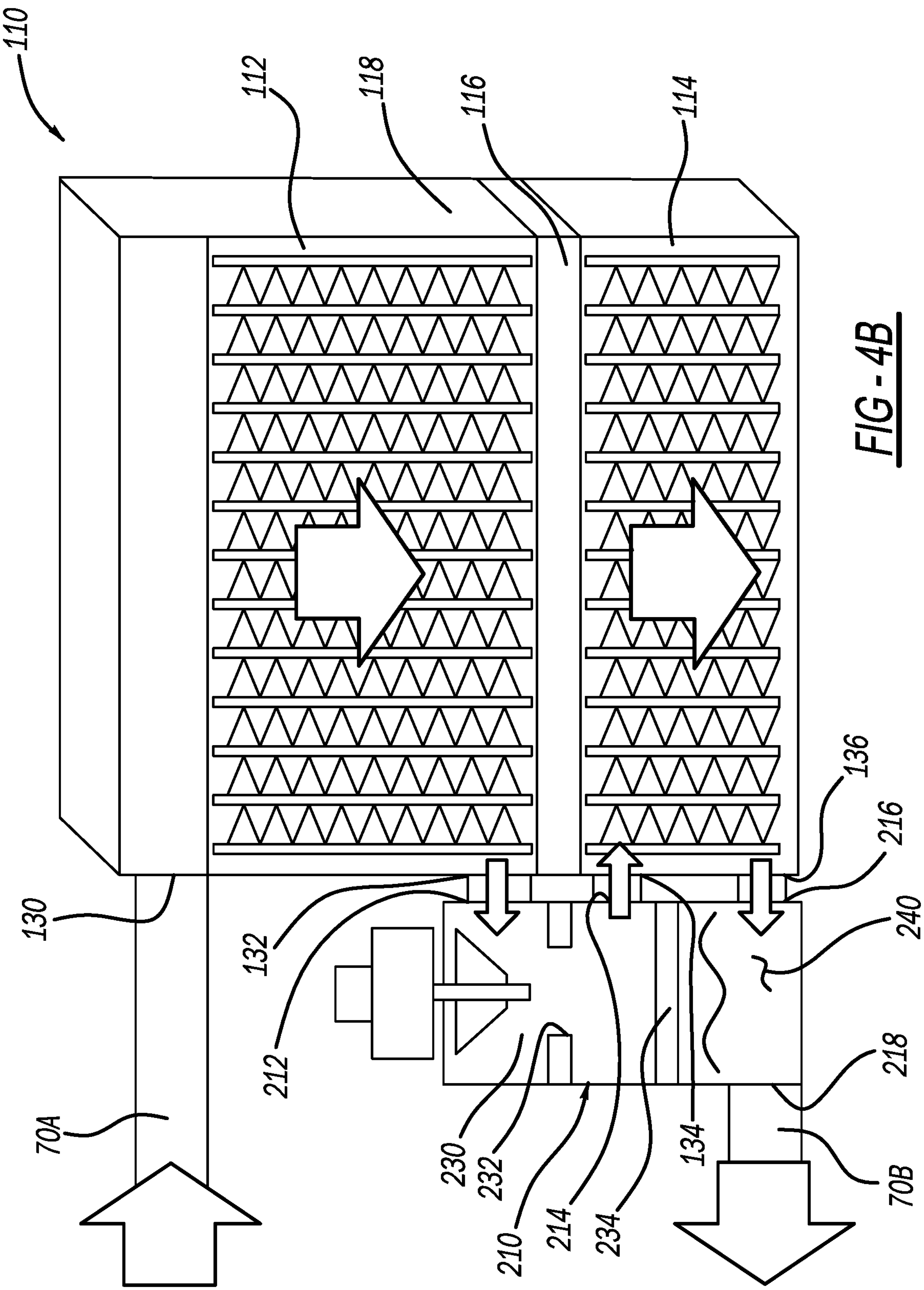
FIG. 4B illustrates the cabin condenser assembly and the regulator thereof, the regulator in a fully open position.

The regulator 210 further includes a valve 230 seated in valve chamber 232. The valve chamber 232 is isolated from the passageway 240 by any suitable divider 234. The valve 230 controls flow of refrigerant through the regulator 210, and thus controls flow of refrigerant from the first cabin condenser portion 112 to the second cabin condenser portion 114. The valve 230 is any suitable valve configured to be open a first degree (as illustrated in FIG. 4A, for example) when refrigerant entering the first cabin condenser portion is at a first temperature. The valve 230 is configured to be open a second degree (as illustrated in FIG. 4B, for example), which is greater than the first degree of FIG. 4A, to increase refrigerant flow through the second cabin condenser portion 114 when refrigerant entering the second cabin condenser portion 114 is at a second temperature that is greater than the first temperature.

The present disclosure provides numerous advantages over the art. For example, with current HVAC systems when the temperature of the refrigerant is excessively heated at the chiller due to an increase in temperature of the battery 20, the refrigerant will cause the cabin condenser to generate excessive heat, which may make passengers in the vehicle uncomfortable. In contrast to the prior art, with the present disclosure when the refrigerant is heated to the second temperature at the chiller 22, the regulator 210 opens the valve 230 to increase the flow of refrigerant through the second cabin condenser portion 114. Also, the HVAC system 10 opens the door 82 to direct airflow (or increase the amount of airflow) through the second cabin condenser portion 140. As a result, the cabin condenser 110 is more effective at releasing heat, and a portion of that heat is released to airflow flowing through the second cabin condenser portion 114 and through the second airflow duct portion 64 to an exterior of the vehicle. Due to the increased refrigerant flow through the second cabin condenser portion 114, the heat released at the first cabin condenser portion 112 is reduced, which advantageously results in the airflow through the first cabin condenser portion 112 (and ultimately to the passenger cabin) being heated to a lesser degree than when flow through the second cabin condenser portion 14 is limited by the valve 230 being in the slightly opened position of FIG. 4A. As a result, even when the chiller 22 heats the refrigerant to the second temperature (due to the battery 20 generating increased heat) occupants of the passenger cabin will remain comfortable. One skilled in the art will appreciate that the present disclosure provides numerous additional advantages as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A cabin condenser for a heating, ventilation, and air conditioning (HVAC) system for a battery electric vehicle (BEV), the cabin condenser comprising:

a first cabin condenser portion;

a second cabin condenser portion;

a regulator configured to control flow of refrigerant from the first cabin condenser portion to the second cabin condenser portion, the regulator defines a first chamber through which refrigerant flows from the first cabin condenser portion into the second cabin condenser portion, and the regulator defines a second chamber through which refrigerant flows from the second cabin condenser portion, a divider separates the first chamber from the second chamber so that the first chamber is fluidly independent of the second chamber; and an airflow divider between the first cabin condenser portion and the second cabin condenser portion to separate airflow through the first cabin condenser portion from airflow through the second cabin condenser portion;

wherein airflow through the first cabin condenser portion flows to a passenger cabin of the BEV, and airflow through the second cabin condenser portion flows to an exterior of the BEV.

2. The cabin condenser of claim 1, wherein:

the first cabin condenser portion includes a first condenser inlet in receipt of refrigerant warmed by a chiller, and includes a first condenser outlet connected to a first regulator inlet of the regulator; and the second cabin condenser portion includes a second condenser inlet in receipt of refrigerant from a regulator outlet of the regulator, and includes a second condenser outlet;

wherein the first chamber of the regulator is between the first regulator inlet and the regulator outlet.

3. The cabin condenser of claim 2, wherein the second condenser outlet is connected to a second regulator inlet of the regulator that is in direct fluid communication with the second chamber.

4. The cabin condenser of claim 1, wherein:

the regulator includes a valve within the first chamber, the valve is configured to be open a first degree when refrigerant entering the first cabin condenser portion is at a first temperature; and the valve is configured to be open a second degree that is greater than the first degree to increase refrigerant flow through the second cabin condenser portion when refrigerant entering the second cabin condenser portion is at a second temperature that is greater than the first temperature.

5. The cabin condenser of claim 1, wherein the first cabin condenser portion and the second cabin condenser portion are spaced apart.

6. The cabin condenser of claim 1, wherein the first cabin condenser portion and the second cabin condenser portion are in a common housing.

7. The cabin condenser of claim 1, further comprising:

a first airflow control device configured to control airflow across the first cabin condenser portion; and a second airflow control device configured to control airflow across the second cabin condenser portion.

8. A heating, ventilation, and air conditioning (HVAC) system for a battery electric vehicle (BEV) comprising:

a chiller configured to cool a battery of the BEV;

a cabin condenser in fluid communication with the chiller to receive refrigerant warmed by the chiller, the cabin condenser including a first cabin condenser portion, and a second cabin condenser portion; and a regulator configured to control flow of refrigerant from the first cabin condenser portion to the second cabin condenser portion, the regulator defines a first chamber through which refrigerant flows from the first cabin condenser portion into the second cabin condenser portion, and the regulator defines a second chamber through which refrigerant flows from the second cabin condenser portion, a divider separates the first chamber from the second chamber so that the first chamber is fluidly independent of the second chamber;

wherein the first cabin condenser portion is in a first airflow duct portion that directs airflow to a passenger cabin of the BEV, and the second cabin condenser portion is in a second airflow duct portion that directs airflow to an exterior of the BEV such that airflow through the first cabin condenser portion is independent of airflow through the second cabin condenser portion.

9. The HVAC system of claim 8, further comprising a compressor along a refrigerant line between the chiller and the cabin condenser, the compressor configured to compress refrigerant flowing from the chiller to the cabin condenser.

10. The HVAC system of claim 1, further comprising an evaporator in the first airflow duct portion upstream of the cabin condenser.

11. The HVAC system of claim 1, further comprising a first airflow control device configured to control airflow across the first cabin condenser portion; and a second airflow control device configured to control airflow across the second airflow duct portion.

12. The HVAC system of claim 11, wherein the first airflow control device is a first airflow control door at an upstream face of the condenser; and wherein the second airflow control device is a second airflow control door at a junction between the first airflow duct portion and the second airflow duct portion.

13. The HVAC system of claim 8, wherein:

the regulator includes a valve within the first chamber, the valve is configured to be open a first degree when refrigerant entering the first cabin condenser portion is at a first temperature; and the valve is configured to be open a second degree that is greater than the first degree to increase refrigerant flow through the second cabin condenser portion when refrigerant entering the second cabin condenser portion is at a second temperature that is greater than the first temperature.

14. The HVAC system of claim 13, wherein the valve is configured to be open the first degree when a waste heat capacity of the chiller is at a first capacity; and wherein the valve is configured to be open at the second degree when the waste heat capacity of the chiller is at a second capacity that is greater than the first capacity.

15. The HVAC system of claim 8, wherein:

the first cabin condenser portion includes a first condenser inlet in receipt of refrigerant warmed by the chiller, and includes a first condenser outlet connected to a first regulator inlet of the regulator;

the second cabin condenser portion includes a second condenser inlet in receipt of refrigerant from a regulator outlet of the regulator, and includes a second condenser outlet; and the second condenser outlet is connected to a second regulator inlet of the regulator;

wherein the first chamber of the regulator is between the first regulator inlet and the regulator outlet.

16. The HVAC system of claim 15, wherein the first cabin condenser portion is spaced apart from the second cabin condenser portion.

17. The HVAC system of claim 8, further comprising an external condenser in a refrigerant loop in receipt of refrigerant from the chiller.

18. The HVAC system of claim 8, further comprising a thermostatic expansion valve upstream of the chiller.

* * * * *